(12) United States Patent
Park et al.

(10) Patent No.: US 8,525,795 B2
(45) Date of Patent: *Sep. 3, 2013

(54) APPARATUS AND METHOD FOR INPUTTING CHARACTERS IN A TERMINAL

(75) Inventors: Se-Hwan Park, Suwon-si (KR); Hyun-Ju Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,219

(22) Filed: May 25, 2012

(65) Prior Publication Data

US 2012/0235941 A1   Sep. 20, 2012

Related U.S. Application Data

(63) Continuation of application No. 12/389,967, filed on Feb. 20, 2009, now Pat. No. 8,207,943.

(30) Foreign Application Priority Data

Feb. 20, 2008   (KR) .......................... 10-2008-0015562

(51) Int. Cl.
*G06F 3/01*   (2006.01)

(52) U.S. Cl.
USPC ........................................................ 345/171

(58) Field of Classification Search
None
See application file for complete search history.

(56) References Cited

U.S. PATENT DOCUMENTS 6,934,564 B2   8/2005   Laukkanen et al.
2007/0139382 A1   6/2007   Kotipalli

FOREIGN PATENT DOCUMENTS

JP   2000-132311   5/2000
JP   2000-322181   11/2000

*Primary Examiner* — Joseph Haley
(74) *Attorney, Agent, or Firm* — The Farrell Law Firm, P.C.

(57) ABSTRACT

An apparatus and method for inputting Hindi characters in a terminal. A touch screen displays a first key set and a second key set. The first key set includes first letter keys with all consonants and a combination lock key for entering a compound consonant. The second key set includes a first letter selected from the first key set and second letter keys with predetermined vowels combinable with the first letter. Upon selection of the first letter from the first key set, a controller controls the touch screen to display the second key set and receives at least one letter from the first and second key sets.

18 Claims, 9 Drawing Sheets

| क ka [ka] | ख kha [kʻa] | ग ga [ga] | घ gha [gʻa] | ङ na [ŋa] | —210
| च ca [k ] | छ cha [ʧʻa] | ज ja [ʤa] | झ jha [ʤʻa] | ञ ña [ɲa] | —220
| ट ta [ta] | ठ tha [tʻa] | ड da [da] | ढ dha [dʻa] | ण na [ɳa] | —230
| त ta [ta] | थ tha [tʻa] | द da [da] | ध dha [dʻa] | न na [na] | —240
| प pa [pa] | फ pha [pʻa] | ब ba [ba] | भ bha [bʻa] | म ma [ma] | —250
| य ya [ja] | र ra [ra] | ल ia [ia] | व va [va] | | —260
| श sa [ʃa] | ष sa [ʃa] | स sa [??] | | | —270
| ह ha [ha] | | | | |

| अ | आ | इ | ई | उ | ऊ | ए | ऐ | ओ | औ | अं | अः | अँ | ऋ |
| a | ā | i | ī | u | ū | e | ai | o | au | an | ah | ām | r |
| [ʌ] | [a] | [i] | [i:] | [u] | [u:] | [e] | [æ:] | [o] | [ɔ:] | [ʌɲ] | [ah] | [ā:] | [ɽ] |
| प | पा | पि | पी | पु | पू | पे | पै | पो | पौ | पं | पः | पाँ | पृ |
| pa | pā | pi | pī | pu | pū | pe | pai | po | pau | pan | pan | pām | pr |

APPARATUS AND METHOD FOR INPUTTING CHARACTERS IN A TERMINAL

PRIORITY

This application is a Continuation of U.S. application Ser. No. 12/389,967, which was filed in the U.S. Patent and Trademark Office on Feb. 20, 2009 and claims priority to a Korean Patent Application filed in the Korean Intellectual Property Office on Feb. 20, 2008 and assigned Serial No. 10-2008-0015562, the content of which is incorporated herein by reference.

BACKGROUND OF THE INVENTION

1. Field of the Invention

The embodiments of the present invention relate generally to an apparatus and method for inputting characters in a terminal, and more particularly, to an apparatus and method for inputting Hindi characters (Devanagari) on a touch screen of a terminal.

2. Description of the Related Art

Personal terminals, i.e., small-size terminals that users carry with them, include, for example, Personal Data Assistants (PDAs), wireless communication terminals, Moving Picture Experts Group (MPEG)-1 Audio Layer 3 (MP3) players, Bluetooth devices, and digital cameras. The PDA will be used as an example herein.

A PDA typically has the core of a computer, i.e. a Central Processing Unit (CPU), a memory, an Operating System (OS), OS-based software programs, and peripheral devices. The PDA can perform various functions of information collection, storage, editing, and searching and has also developed into a composite device equipped with a portable phone module, for voice communications and data communications, even over the Internet.

The PDA is usually includes a touch screen such as a Liquid Crystal Display (LCD) and a touch panel mounted on the display. A user invokes an intended application by touching an icon displayed on the touch screen or enters characters by touching a touch keyboard displayed in a predetermined area of the touch screen. The user commonly touches the screen using a finger or a pointer, such as a stylus.

Figure 1A:
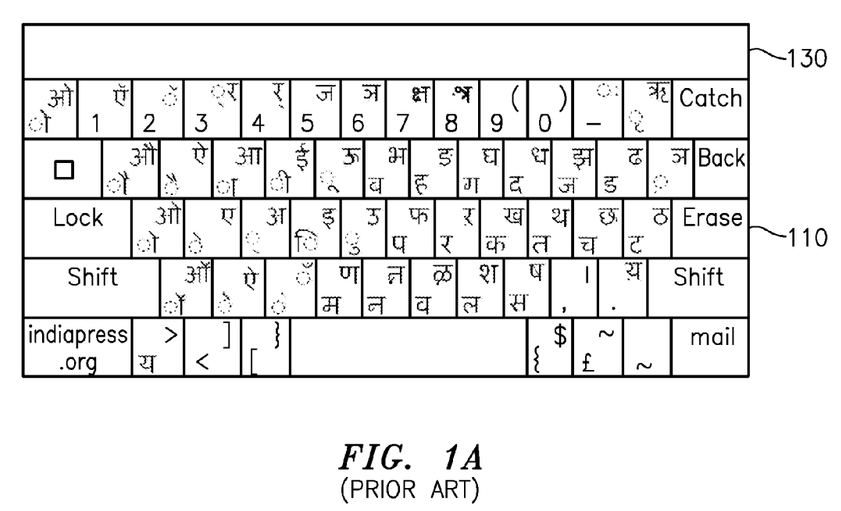
FIG. 1A illustrates a conventional keyboard layout of a touch screen keyboard layout for inputting Hindi characters in a terminal.

FIG. 1A illustrates a conventional keyboard layout for a screen touch keyboard for inputting Hindi characters in a terminal.

Referring to FIG. 1A, the touch screen includes a touch keyboard area 110 with keys for inputting characters and a display area 130 for displaying a character corresponding to a key entered through the touch keyboard area 110. For example, a keyboard layout as designed for a Personal Computer (PC) also applies to the touch keyboard area 110.

Figure 1B:
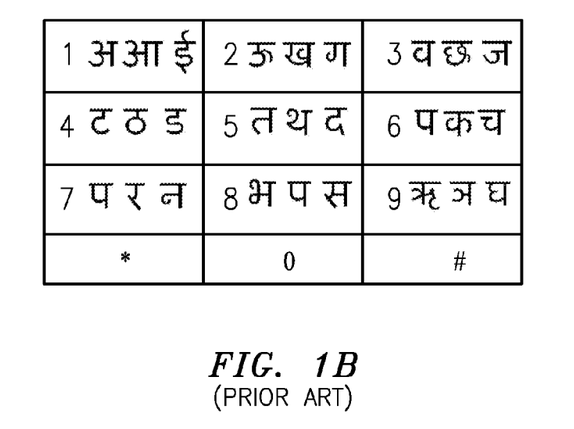
FIG. 1B illustrates a conventional 3×4 layout of a touch screen keyboard layout for inputting Hindi characters in a terminal.

FIG. 1B illustrates a conventional 3×4 layout of a touch screen keyboard layout for inputting Hindi characters in a terminal.

Referring to FIG. 1B, 10 or more Hindi letters are mapped to each key in the 3×4 layout, for inputting Hindi characters. With the 3×4 layout, a user enters an intended character by repeatedly pressing a key corresponding to the character and thus rotating letters mapped to the key.

When using the keyboard layout of FIG. 1A, the touch keyboard of the touch screen should be scaled down due to a limited size of the touch screen. The resulting decrease in a key size on the touch keyboard, however, makes it inconvenient for the user to view and touch keys. Thus, character entry is often difficult. Additionally, the 3×4 layout of FIG. 1B also has a shortcoming in that character input speed is slow because the same key must be repeatedly pressed, possibly 20 times, to enter one Hindi letter.

Accordingly, there is still a need for a method and apparatus for facilitating Hindi character entry on a touch screen in a terminal.

SUMMARY OF THE INVENTION

The present invention has been designed to address at least the problems and/or disadvantages and to provide at least the advantages described below. Accordingly, an aspect of the embodiments of the present invention is to provide an apparatus and method for inputting Hindi characters through a touch screen that facilitates Hindi character entry in a terminal.

In accordance with an aspect of the embodiments of the present invention, an apparatus for inputting Hindi characters through a touch screen in a terminal is provided, in which a touch screen displays a first key set and a second key set. The first key set includes first letter keys with all consonants and a combination lock key for entering a compound consonant. The second key set includes a first letter selected from the first key set and second letter keys with predetermined vowels combinable with the first letter. Upon selection of the first letter from the first key set, a controller controls the touch screen to display the second key set and receives at least one letter from the first and second key sets.

In accordance with another aspect of the embodiments of the present invention, a method for inputting Hindi characters through a touch screen in a terminal is provided. The method includes displaying a first key set including first letter keys with all consonants and a combination lock key for entering a compound consonant, displaying a second key set including a first letter selected from the first key set and second letter keys with predetermined vowels combinable with the first letter, upon selection of the first letter from the first key set, and receiving at least one letter from the first and second key sets.

BRIEF DESCRIPTION OF THE DRAWINGS

The above and other aspects, features, and advantages of the embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS

The matters defined in the description, such as a detailed construction and specific elements, are provided to assist in a comprehensive understanding of the embodiments of the invention. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

The embodiments of the present invention are directed to inputting Hindi characters on a touch screen that facilitates Hindi character entry. For inputting Hindi characters, a minimum number of keys are displayed on the touch screen. When one of the keys is selected, a smaller set of keys that can be combined with the previously selected key is then displayed. In accordance with an embodiment of the present invention, a key is selected by pressing and releasing the key or pressing, dragging, and releasing the key. Herein, the consonants and vowels of the Hindi alphabet are referred to as "letters" and keys for entering the consonants or the vowels are referred to as "letter keys".

While the present invention will be described in the context of a touch screen having consonant keys or vowel keys, the keys arrayed in the touch screen can be changed according to the use frequency or purposes of the keys and alternate key layouts can be adopted.

According to an embodiment of the present invention, all consonants of the Hindi alphabet are grouped into predetermined consonant groups. The touch screen displays, in a touch keyboard area, an initial screen having at least consonant group keys corresponding to the consonant groups and displays a pop-up screen over a consonant key selected from the initial screen. The pop-up screen includes at least a minimum number of vowel keys corresponding to vowels that are combinable with a consonant corresponding to the selected consonant key.

Figure 2:
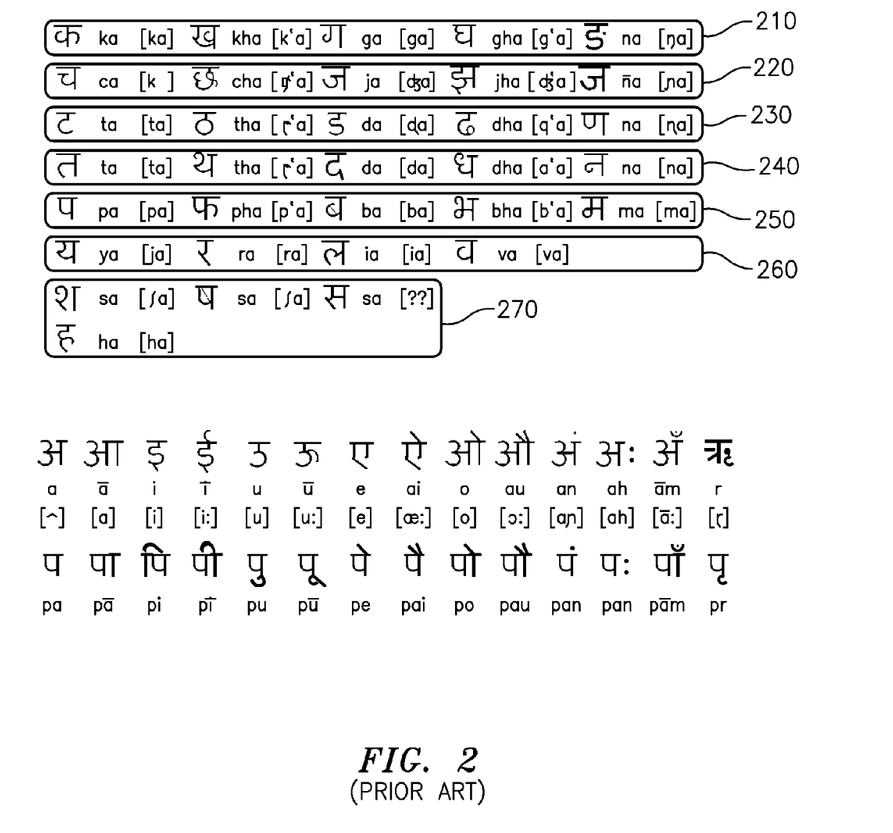
FIG. 2 illustrates an arrangement of the Hindi alphabet according to an embodiment of the present invention.

FIG. 2 illustrates an arrangement of the Hindi alphabet according to an exemplary embodiment of the present invention.

Referring to FIG. 2, the Hindi alphabet includes 33 consonants, which can be combined with vowels as illustrated in the lower half of FIG. 2. According to the embodiment of the present invention, consonant groups 210 and 270 each may have phonetically similar consonants.

Herein, in the touch screen, the keys including at least the consonant group keys displayed on the initial screen of a touch keyboard area are referred to as "a first key set" and the keys including at least the minimum number of vowel keys displayed on the pop-up screen are referred to as "a second key set". The keys of the first and second key sets are of predetermined sizes. For example, each key of the second key set is of a size sufficient enough to enable selection of any key of the first key set without inconvenience, while the key of the second key set is displayed. Each key of the second key set is of a size that does not cause inconvenience in selecting the key. For example, the second key set can be overlaid on a key selected by the first selected key. In another example, the first and second key sets can be the same size or a similar size.

Figure 3:
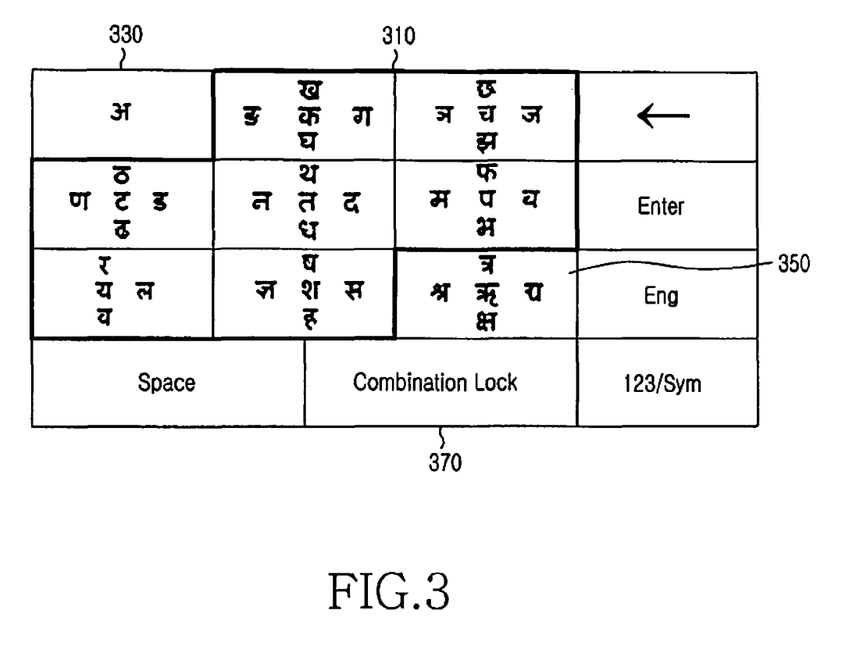
FIG. 3 illustrates a first key set for inputting Hindi characters according to an embodiment of the present invention.

FIG. 3 illustrates a first key set for inputting Hindi characters according to an embodiment of the present invention.

Referring to FIG. 3, the first key set includes seven consonant group keys 310, a vowel key 330 for entering a vowel with a high frequency of occurrence as an initial sound, an other group key 350 having a vowel क with a low frequency of occurrence as an initial sound and conjunctions with a high frequency of occurrence or conjunctions that cannot be input by combining consonants (e.g. त, श, ऋ, द), a Combination Lock key 370 for entering consonants successively, and function keys (i.e., ←, Space, Enter, Eng, and 123/Symbol). Alternatively, in accordance with another embodiment of the present invention, the vowels with high and low frequencies of occurrence are grouped and mapped to a single vowel group key.

In each of the consonant group keys 310 and the other group key 350, the letters are mapped at the center, above, below, at the left, and at the right of the group key, one at each position.

When a user wants to enter the center letter of a key in the first key set, he presses and releases the key. Thereafter, a second key set is displayed. However, if the user wants to enter the right letter of a key in the first key set, the user presses the key, drags it to the right, and the releases the key. Thereafter, a second key set is displayed.

Similarly, when the user is to enter the upper, lower, or left letter of a key in the first key set, the user presses the key, drags it up, down, or to the left, respectively, and then releases the key in a similar manner as inputting the right letter. Thereafter, a second key set is displayed.

If the user is to enter a compound consonant by successively selecting intended consonants from the first key set without using a second key set, the user selects the Combination Lock key 370 and then consonant group keys including the consonants. That is, when the Combination Lock key 370 selected, any second key set is not displayed until the last consonant forming the compound consonant is selected.

Figure 4:
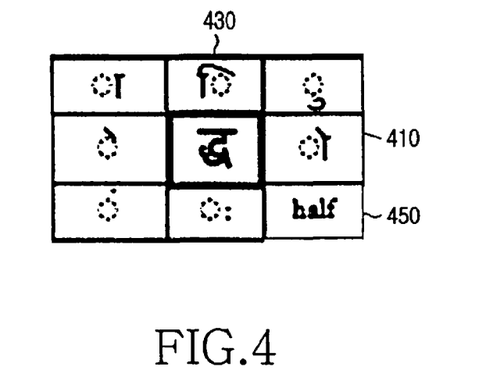
FIG. 4 illustrates a second key set for inputting Hindi characters according to an embodiment of the present invention.

FIG. 4 illustrates a second key set for inputting Hindi characters according to an embodiment of the present invention.

Referring to FIG. 4, a second key set includes a letter key 410 corresponding to a letter selected from the first key set, a minimum number of vowel keys 430 (e.g., ा, ि, ी, ु, ू, ो, ौ: keys) for vowels that are combinable with the selected letter, and a letter conversion key, i.e., a half key 450, for deleting "a" pronounced in the selected letter.

Figure 5:
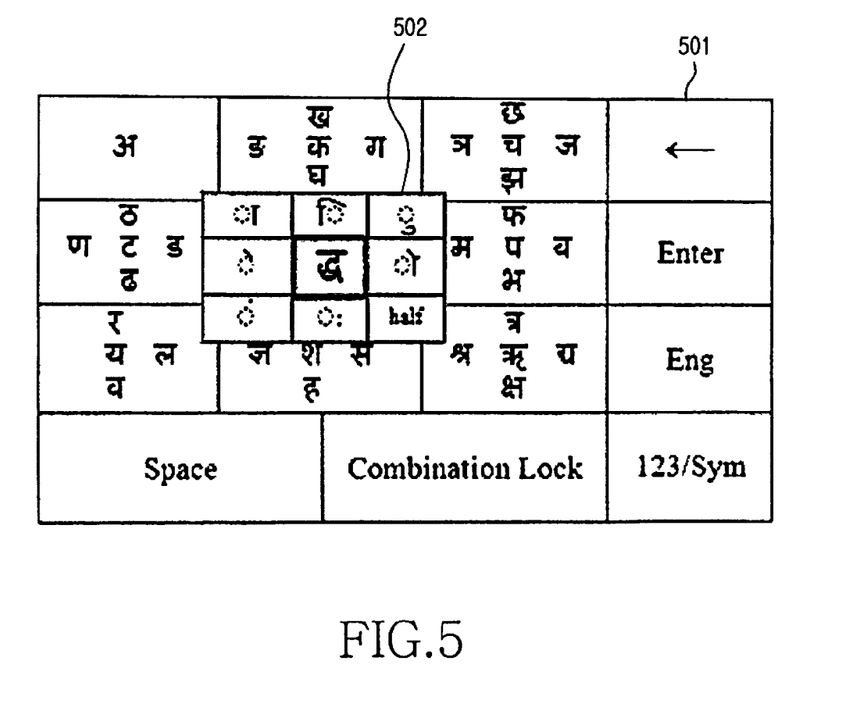
FIG. 5 illustrates overlaying a second key set over the first key set, for inputting Hindi characters according to an embodiment of the present invention.

FIG. 5 illustrates overlaying a second key set over the first key set, for inputting Hindi characters according to an embodiment of the present invention.

Referring to FIG. 5, when a key is selected from the first key set 501 with the Combination Lock key not selected, a second key set 502 is displayed. The second key set 502 disappears when a key of the second key set is selected.

Referring to FIGS. 4 and 5, the vowel keys 430 are used to enter vowels corresponding to the vowels specifically shown on the vowel keys 430 and their similar vowels, respectively. In the second key set 502, a ि key is used for entering ि and ी. For example, when the ि key is pressed and released, the vowel ि is entered. However, if the ि key is pressed, then dragged within a predetermined direction (e.g., outside the area of the selected key), and then released, ी is entered.

A ॐ key is used for entering ॐ and ऒ. For example, when the ॐ key is pressed and released, the vowel ॐ is entered. However, if the ॐ key is pressed, then dragged within a predetermined direction, and then released, ऒ is entered.

A ऒ key is used for entering ऒ and ऑ. For example, when the ऒ key is pressed and released, the vowel ऒ is entered. However, if the ऒ key is pressed, then dragged within a predetermined direction, and then released, ऑ is entered.

A ओ key is used for entering ओ and औ. For example, when the ओ key is pressed and released, the vowel ओ is entered. However, if the ओ key is pressed, then dragged within a predetermined direction, and then released, ओ is entered.

Figure 6:
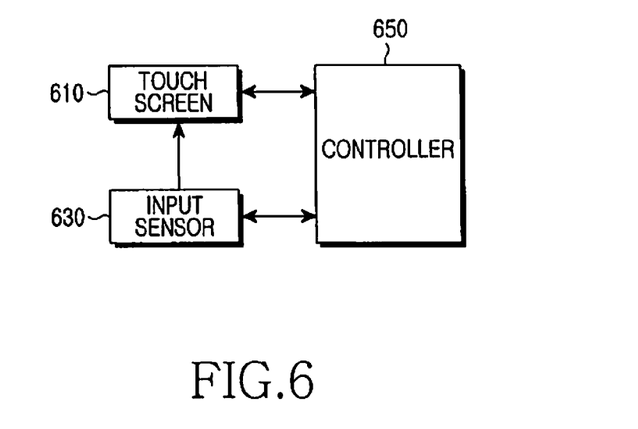
FIG. 6 is a block diagram of an apparatus for inputting Hindi characters through a touch screen according to an embodiment of the present invention.

FIG. 6 is a block diagram of an apparatus for inputting Hindi characters through a touch screen according to an embodiment of the present invention.

Referring to FIG. 6, the Hindi character input apparatus according to the embodiment of the present invention includes a touch screen 610 including a touch screen keyboard area (not shown) and a display area (not shown), an input sensor 630, and a controller 650.

The touch screen 610 displays the first key set or both the first and second key sets under the control of the controller 650 and displays a letter selected from the second key set in the display area.

The input sensor 630 senses selection of a particular key through the touch screen 610 and notifies the controller 650 of the selected key. For example, the input sensor 630 senses whether the particular key has been pressed and released, or pressed, dragged, and released through the touch screen 610.

The controller 650 controls the touch screen 610 to display the first key set or both the first and second key sets and to display a letter selected from the second key set.

Figure 7A:
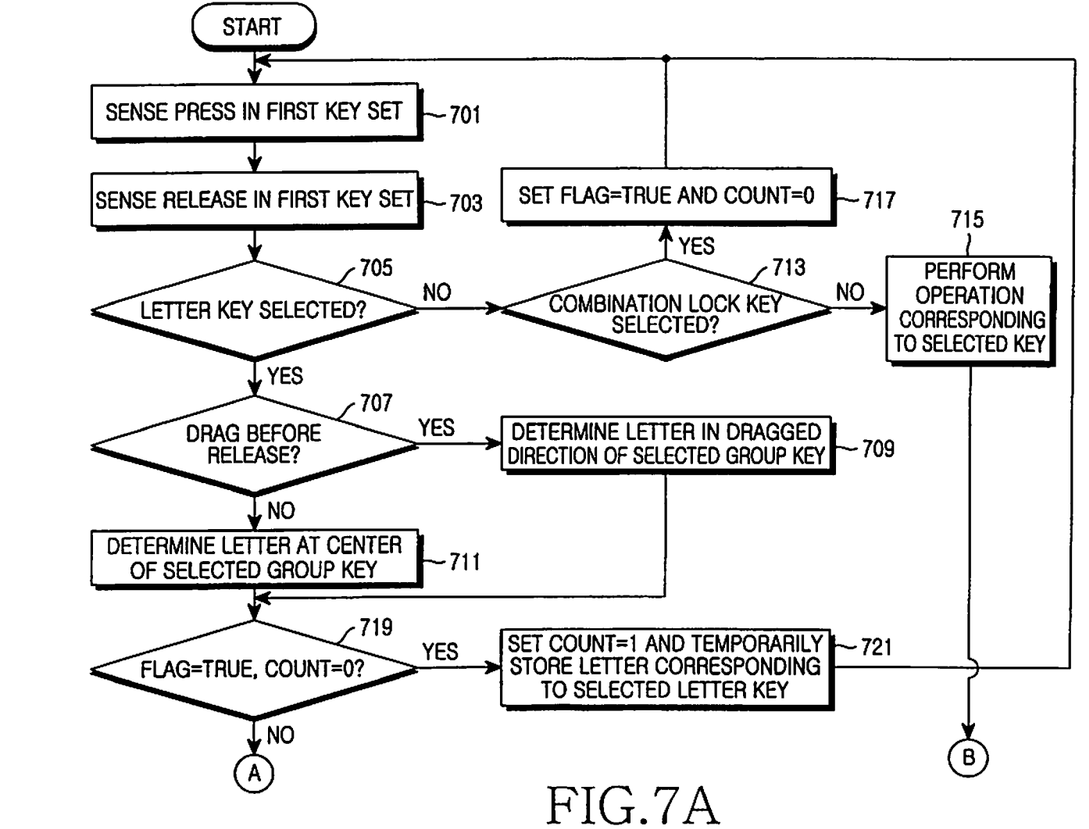
FIG. 7A and FIG. 7B is a flowchart illustrating a method for inputting Hindi characters through a touch screen according to an embodiment of the present invention.
Figure 7B:
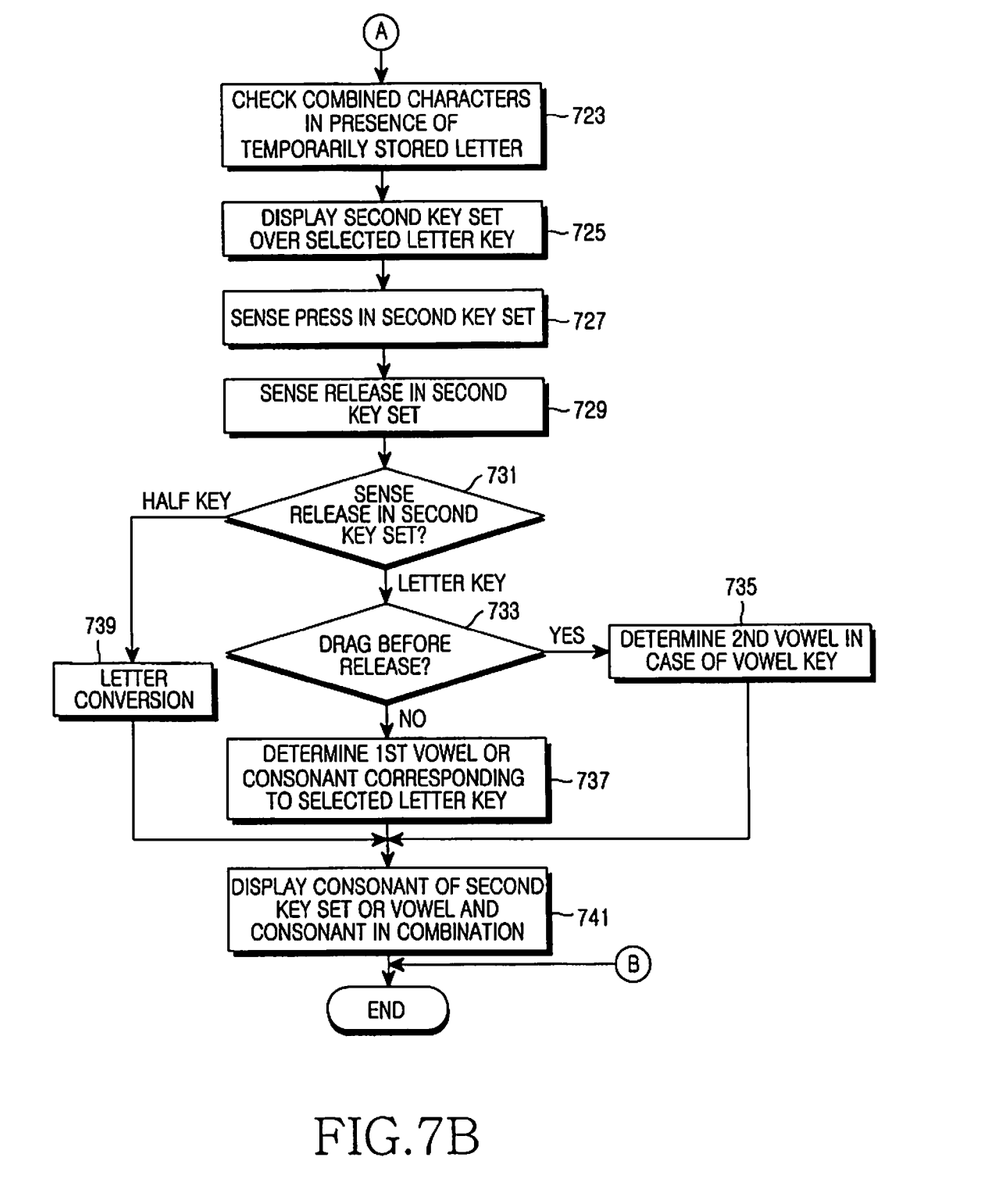

FIG. 7A and FIG. 7B is a flowchart illustrating a method for inputting Hindi characters through a touch screen according to an exemplary embodiment of the present invention.

Referring to FIG. 7A and FIG. 7B, in step 701, the controller 650 senses that a particular key is pressed in the first key set and determines the pressed position. In step 703, the controller 650 senses that the pointer has been released in the first key set and determines the released position.

If the selected key is a letter key in step 705, the controller 650 determines if the pointer has been dragged before the release by comparing the pressed position with the released position in step 707. If the dragging has preceded the release, the controller 650 determines a letter positioned in the dragged direction among the letters mapped onto the selected key in step 709. However, if no dragging has occurred, the controller 650 determines a letter positioned in the center of the selected letter key in step 711.

If the selected key is not a letter key in step 705, the controller 650 determines if the selected key is the Combination Lock key in step 713. If the selected key is not the Combination Lock key, in step 715, the controller 650 performs an operation corresponding to the selected key, determining that a function key was selected. If it is determined that the Combination Lock key was selected in step 713, the controller 650 sets a combination status flag to true (flag=true) and a count to 0 (count=0) in step 717, without displaying a second key set in order to receive consonants successively. Thereafter, the controller 650 determines if another letter key has been pressed in the first key set in step 701.

In step 719, the controller 650 determines whether flag=true and count=0. If flag=true and count=0, the controller 650 sets the count to 1 (count=1) and temporarily stores the letter corresponding to the selected letter key in step 721. However, if not flag=true and count=0, the controller 650 checks combined characters in the of presence of a temporarily stored letter in step 723.

In step 725, the controller 650 controls the touch screen 610 to display a second key set having the determined consonant or the combined characters at the center, over the selected letter key. The controller 650 senses pressing of the second key set and determines the pressed position in step 727. In step 729, the controller 650 senses a releasing of the second key set from the input sensor 630 and determines the released position.

The controller 650 determines whether the pressed and released key is a letter key or the half key in step 731. In the case of a letter key, in step 733, the controller 650 determines if dragging has preceded the release by comparing the pressed position with the released position. If the dragging has happened, the controller 650 determines a second vowel corresponding to the selected key when the selected key is a vowel key, in step 735, and displays a combination of the determined vowel and the consonant disposed on the second key set, on the touch screen in step 741.

However, if the dragging has not occurred before the release in step 733, the controller 650 determines a consonant or a first vowel corresponding to the selected letter key in step 737, and then displays the consonant disposed on the second key set or a combination of the determined vowel and the consonant disposed on the second key set, on the touch screen in step 741.

In the case of the half key in step 731, the controller 650 identifies a letter resulting from eliminating "a" from the selected key in step 739 and then displays the consonant disposed on the second key set, on the touch screen in step 741.

FIGS. 8A to 8F illustrate a Hindi character input in a Hindi character input method according to an embodiment of the present invention. More specifically, with reference to FIGS. 8A to 8F, a user's input of a word बुद्धि [buddhi] composed of consonant ब, vowel ु, consonant द, consonant ध, and vowel ि will be described below.

Figure 8A:
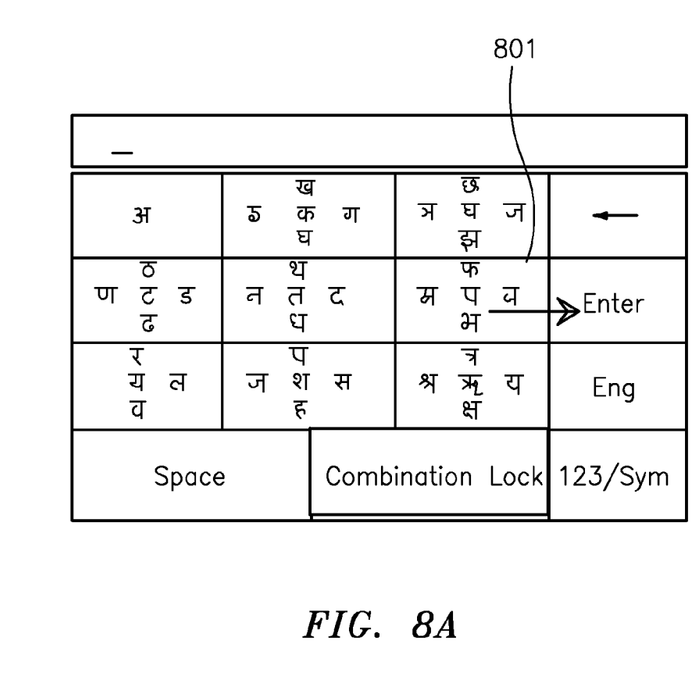
FIGS. 8A to 8F illustrate a Hindi character input in the Hindi character input method according to the embodiment of the present invention.
Figure 8B:
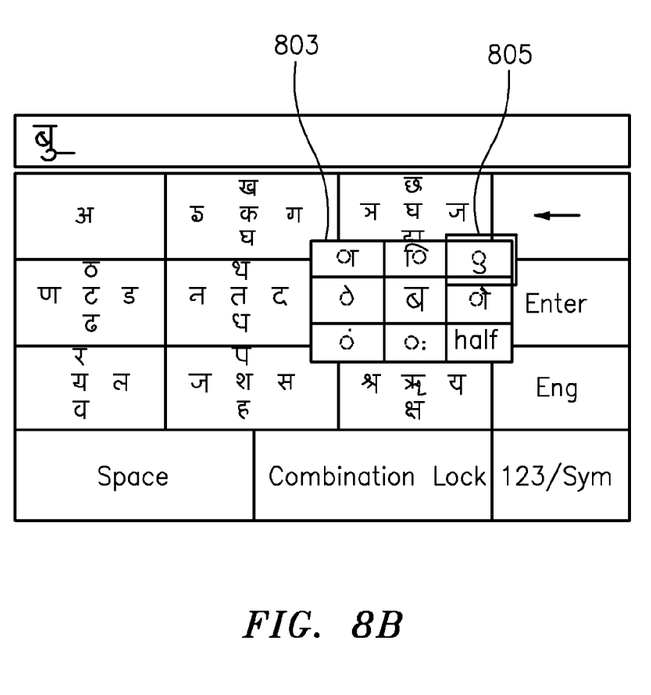

Referring to FIG. 8A, a user presses a consonant group key 801 including a consonant ब key, drags it to the right, and then releases it to enter the consonant ब. Thereafter, a second key set 803 is displayed over the consonant group key 801 in FIG. 8B. When the user selects a vowel ु key 805, corresponding to the vowel ु from the second key set 803, the consonant ब and the vowel ु are combined and displayed as a character pronounced [bu].

Figure 8C:
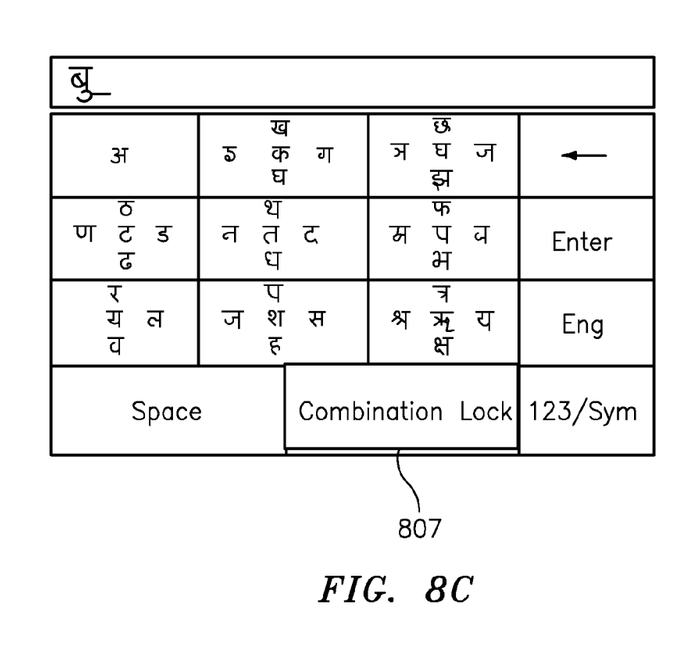
Figure 8D:
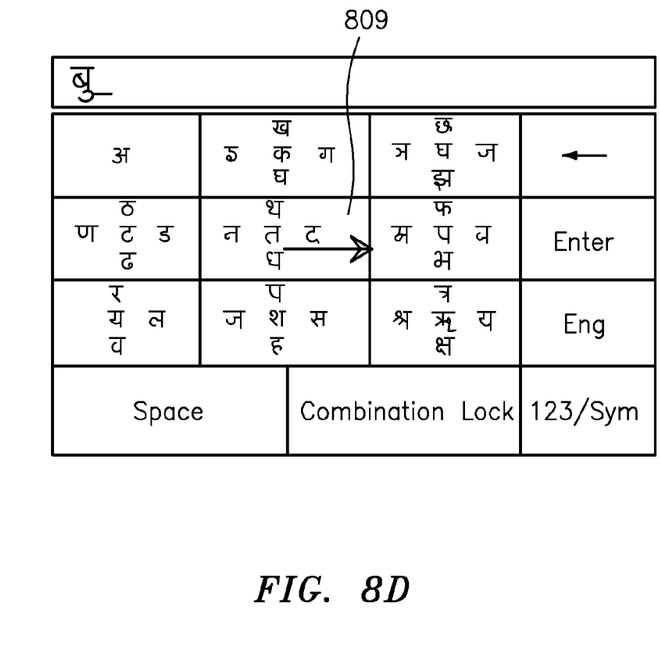
Figure 8E:
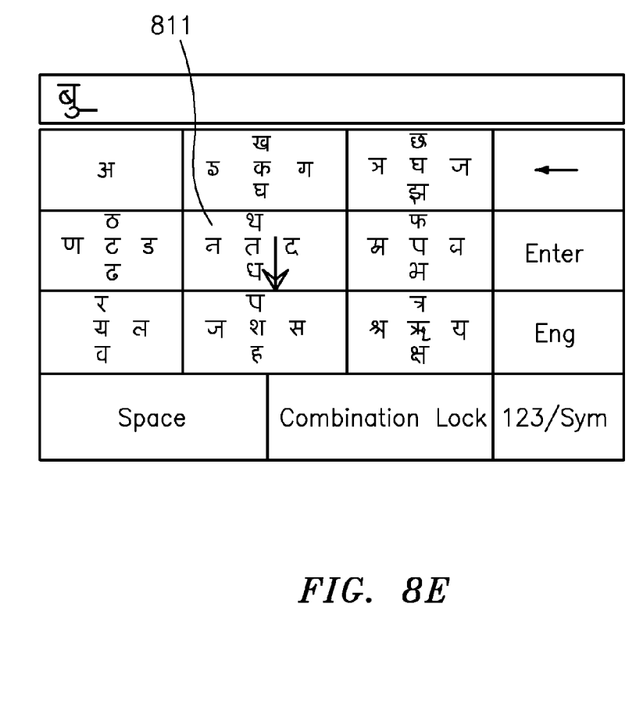
Figure 8F:
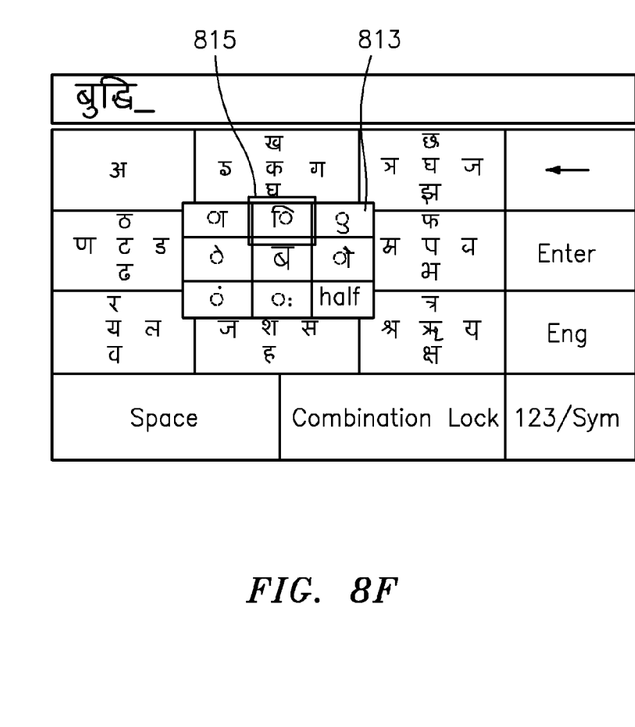

To enter consonants successively, the user selects a Combination Lock key 807 in FIG. 8C. The user then presses a consonant group key 809 including a consonant द key, drags it to the right, and then releases it to enter the consonant द in FIG. 8D. Due to the selection of the Combination Lock key 807, a second key set is not displayed. Instead, referring to FIG. 8E, the user presses a consonant group key 811 including a consonant ध key, drags it downward, and then releases it to enter the consonant ध . Thus, a second key set 813 is displayed over the consonant group key 809 and the resulting compound consonant is positioned on the second key set 813 in FIG. 8F. When the user selects a vowel िे key 815 corresponding to the vowel िे from the second key set 813, the word pronounced "buddhi" is displayed in the display area as a combination of the consonant ब , the vowel ु , the consonant द , the consonant ध , and the vowel िे .

As is apparent from the above description, the embodiments of the present invention advantageously facilitate Hindi character input by displaying a minimum number of keys on a touch screen and displaying a second key set having keys combinable with a key selected from among the minimum number of keys over the selected key.

Also, the embodiments of the present invention minimize the number of keys for entering Hindi characters arranged in a first key set on the touch screen using a second key set.

The embodiments of the present invention also enable a user to enter intended Hindi characters conveniently and fast by displaying the second key set enlarged.

The embodiments of the present invention further reduce the time required for entering Hindi characters by simplifying a Hindi character input pointing process, as compared to the conventional technology.

While the present invention has been shown and described with reference to certain embodiments thereof, it will be understood by those skilled in the art that various changes in form and details may be made therein without departing from the spirit and scope of the invention as defined by the appended claims. As a modified example, the present invention can be applied easily to other languages having consonants and vowels.

What is claimed is:

1. An apparatus for inputting characters in a terminal, comprising:
    a touch screen for displaying a first key set and a second key set, the first key set including first letter keys with consonants and a combination lock key for entering a compound consonant by selecting intended consonants from the first key set without using the second key set, and the second key set including a first letter selected from the first key set and second letter keys including predetermined vowels combinable with the selected first letter; and
    a controller for, upon selection of the first letter from the first key set, controlling the touch screen to display the second key set and receiving at least one letter from the first key set and the second key set,
    wherein upon selection of the combination lock key, the controller controls the touch screen not to display the second key set until a last consonant associated with the compound consonant is selected.

2. The apparatus of claim 1, wherein the first letter keys comprise five consonants positioned above, below, at a left, at a right, and at a center of the selected first letter of the first key set, and
    wherein a center consonant of the selected first letter is selected by pressing and releasing the selected first letter, and upper, lower, left, and right consonants of the selected first letter are selected by pressing the selected first letter key, dragging the selected first letter key up, down, to the left, or to the right, respectively, and releasing the selected first letter key.

3. The apparatus of claim 1, wherein, upon selection of one of the predetermined vowels from the second key set, the controller controls the touch screen to display the first letter and the selected vowel in combination.

4. The apparatus of claim 1, wherein, upon selection of a letter key corresponding to the first letter from the second key set, the controller controls the touch screen to display the first letter.

5. The apparatus of claim 1, wherein, upon selection of a key from the second key set, the controller controls the touch screen to no longer display the second key set.

6. A method for inputting characters through a touch screen in a terminal, comprising:
    displaying, on a display of the terminal, a first key set including first letter keys with consonants and a combination lock key for entering a compound consonant by selecting intended consonants from the first key set without using a second key set;
    selecting a first letter key from the first letter key set;
    displaying, on the display of the terminal, the second key set including a first letter selected from the first key set and second letter keys with predetermined vowels combinable with the selected first letter;
    receiving at least one letter from the first key set and the second key set;
    selecting the combination lock key; and
    delaying the displaying of the second key set until a last consonant associated with the compound consonant is selected.

7. The method of claim 6, wherein the consonants of at least one of the first letter keys includes five letters positioned above, below, at a left, at a right, and at a center of the at least one of the first letter keys, the method further comprising:
    selecting a center consonant of the selected first letter by pressing and releasing the selected first letter key; and
    selecting upper, lower, left, and right letters of the selected first letter by pressing the selected first letter key, dragging the selected first letter key up, down, to the left, or to the right, respectively, and releasing the selected first letter key.

8. The method of claim 6, further comprising, upon selection of one of the predetermined vowels from the second key set, displaying the first letter and the selected vowel in combination.

9. The method of claim 6, further comprising, upon selection of a letter key corresponding to the first letter from the second key set, displaying the first letter.

10. An apparatus for inputting characters through a touch screen in a terminal, comprising:
    a touch screen for displaying a first key set and a second key set, the first key set including a plurality of square first letter keys that have predetermined consonants and a square combination lock key for entering a compound consonant by selecting intended consonants from the first key set without using the second key set, and the second key set including a plurality of square second letter keys to which a plurality of second letters related to a first letter corresponding to a first letter key selected from among the plurality of square first letter keys of the first key set are allocated around the selected first letter; and
    a controller for, upon selection of the first letter key from the first key set, controlling the touch screen to display the second key set and receiving an input of at least one letter of the second key set,
    wherein upon selection of the square combination lock key, the controller controls the touch screen not to display the second key set until a last consonant associated with the compound consonant is selected.

11. The apparatus of claim 10, wherein the touch screen comprises a touch keyboard at a lower portion of the touch screen for displaying the first key set and a display at an upper portion of the touch screen for displaying a letter input through the touch keyboard, wherein a part of the second key set is displayed on the display.

12. The apparatus of claim 11, wherein a letter allocated to a second letter key positioned in a touch input direction on the touch screen is displayed on the display.

13. The apparatus of claim 10, wherein the second key set is displayed at a larger size than the first letter key, not to cover other letter keys adjacent to the first letter key.

14. The apparatus of claim 10, wherein the second key set is highlighted when the second key set is displayed.

15. A character input method of a terminal, comprising:
displaying a first key set on a touch screen, the first key set including a plurality of square first letter keys that have predetermined consonants and a square combination lock key for entering a compound consonant by selecting intended consonants from the first key set without using a second key set;
receiving an input of a first letter key from among the plurality of square first letter keys of the first key set;
displaying the second key set including a plurality of square second letter keys to which a plurality of second letters related to a first letter corresponding to the selected first letter key are allocated around the selected first letter;
receiving an input of at least one of the second letter keys of the second key set;
selecting the square combination lock key; and
delaying the displaying of the second key set until a last consonant associated with the compound consonant is selected.

16. The character input method of claim 15, wherein the touch screen includes a touch keyboard at a lower portion of the touch screen for displaying the first key set and a display at an upper portion of the touch screen for displaying a letter input through the touch keyboard, wherein a part of the second key set is displayed on the display.

17. The character input method of claim 15, wherein receiving an input of at least one of the second letter keys comprises receiving an input of a letter allocated to a second letter key positioned in a touch input direction on the touch screen.

18. The character input method of claim 15, wherein displaying the second key set comprises highlighting the second key set when the second key set is displayed.

* * * * *